US007913264B2

(12) United States Patent
Noblet et al.

(10) Patent No.: US 7,913,264 B2
(45) Date of Patent: Mar. 22, 2011

(54) REMOTE CUSTOMISATION MODULE AND SYSTEM COMPRISING SAID MODULE

(75) Inventors: David Noblet, Nice (FR); Sylvain Masson, Antibes (FR); Marc Pelissier, Le Cannet (FR); Marc Campora, Grasse (FR)

(73) Assignee: Amadeus SAS, Sophia Antipolis Cedex (FR)

( * ) Notice: Subject to any disclaimer, the term of this patent is extended or adjusted under 35 U.S.C. 154(b) by 1036 days.

(21) Appl. No.: 11/709,521

(22) Filed: Feb. 22, 2007

(65) Prior Publication Data

US 2008/0208641 A1    Aug. 28, 2008

(51) Int. Cl.
*G06F 3/00* (2006.01)
*G06F 15/16* (2006.01)

(52) U.S. Cl. .......................................... 719/328; 709/203
(58) Field of Classification Search .................. 719/328; 709/203
See application file for complete search history.

(56) References Cited

U.S. PATENT DOCUMENTS

| 6,141,759 | A  | * | 10/2000 | Braddy ............................ 726/14 |
| 6,684,257 | B1 |   | 1/2004  | Camut et al. |
| 6,996,517 | B1 | * | 2/2006  | Papaefstathiou ................ 703/22 |
| 7,216,142 | B2 | * | 5/2007  | Whipple et al. .............. 709/203 |
| 2002/0099738 | A1 |   | 7/2002 | Grant |
| 2003/0112274 | A1 |   | 6/2003 | Gao et al. |
| 2003/0195997 | A1 |   | 10/2003 | Ibert et al. ................... 709/318 |
| 2004/0006653 | A1 |   | 1/2004 | Kamen et al. |
| 2005/0071850 | A1 |   | 3/2005 | Ittel et al. .................... 719/320 |
| 2005/0138648 | A1 | * | 6/2005 | Ahmed et al. ............... 719/328 |
| 2006/0129971 | A1 | * | 6/2006 | Rojer ............................ 717/104 |
| 2006/0129985 | A1 |   | 6/2006 | Tamura ....................... 717/120 |
| 2006/0143592 | A1 |   | 6/2006 | Bender et al. ............... 717/104 |
| 2006/0150200 | A1 |   | 7/2006 | Cohen et al. ................ 719/328 |
| 2006/0282408 | A1 | * | 12/2006 | Wisely et al. ................... 707/3 |

FOREIGN PATENT DOCUMENTS

GB    2 348 525 A    10/2000

OTHER PUBLICATIONS

Nigel H.Lovell, Web-based Acquisition, Storage, and Retrieval of Biomedical Signals, 2001.*

* cited by examiner

*Primary Examiner* — Lechi Truong
(74) *Attorney, Agent, or Firm* — Drinker Biddle & Reath LLP

(57) ABSTRACT

A remote customisation module for a logic engine, running upon a server remote from said logic engine, comprises a communication interface arranged to communicate with the logic engine and with an application running upon said server. The module also comprises a logic element arranged to receive an incoming request for data from the logic engine via the communication interface. The logic element is arranged to interrogate the application in order to extract data required to fulfill said request. The logic element is also arranged to process said extracted data to generate response data and to pass said response data to the logic engine.

14 Claims, 1 Drawing Sheet

REMOTE CUSTOMISATION MODULE AND SYSTEM COMPRISING SAID MODULE

FIELD OF THE INVENTION

This invention relates to a remote customisation module and a system comprising said module. More particularly, but not exclusively, it relates to a remote customisation module for a business engine and a business system comprising said module. Even more particularly, but not exclusively, it relates to a remote customisation module for a travel booking engine and a travel booking system comprising said module.

BACKGROUND TO THE INVENTION

A business engine hosted by a service provider for clients, for example a travel booking engine hosted by Amadeus S.A.S. for airlines, comprises application software for receiving user requests for a service and for checking availability and prices of the service.

The business engine comprises a large set of business rules. For example, in the case of a flight booking engine the rules may include the type of meal served, whether the booking is for standard class or business class and a flight's origin and terminus. Each client of a service provider requires rules specific to the service that they are offering as well as standard rules associated with all clients. For example, in the case of airlines a different fuel surcharge calculation may apply for each client, or each airline may have its own rules for administering frequent flyer miles.

Currently, the customisation of a business engine involves altering the core code of the business engine held and operated by the service provider.

This has a number of problems associated with it. For example, the number of issues of new versions of the code is controlled strictly. This is because each issuance of a new version of code introduces the possibility of errors in coding entering the operating version of the code. Such coding errors may cause the failure of the code when running. This is undesirable as strict levels of quality of service are imposed by client firms on the service provider. Furthermore, a minor alteration made to the code to satisfy a requirement of a single client may result in the business engine code failing for all of the service provider's clients.

Also, the customisation of the core code to meet a client's requirements can be time consuming. This can cause delays in bringing a client's desired customisation into the marketplace. This limits the functionality of the business engine for the each specific client.

The customisation of the business engine can take place at any one of the layers of the business engine. The construction of the website could be delegated to a customisation service, such as a web design service (WDS). In the application layer an action can be added, or an existing action extended, that works on data received, or produced by the business engine. In the business layer an enterprise Java bean (EJB) can be installed corresponding to the required additional functionality. Alternatively, an existing EJB can be extended by customising an existing data format and implementing a customised command. In the access layer a custom connector can be added or access to a new third party supplier can be provided.

All of these solutions have the same inherent problem that they require a full reintegration of the core code to be operable. Additionally, the addition of a new third party supplier in the access layer presents a possible security risk unless the content of the third party's databases can be verified.

The use of third party supplier's databases would require the transfer of all data associated with a request being transferred across a network. This requires a significant amount of data to be transferred across a network.

SUMMARY OF THE INVENTION

According to a first aspect of the present invention there is provided a remote customisation module for a logic engine, arranged to run on a server remote from said logic engine, comprising;

a communication interface arranged to communicate with the logic engine and with an application running upon a server;

a logic element arranged to receive an incoming request for data from the a plug on the logic engine via the communication interface and being further arranged to interrogate the application in order to extract data required to fulfill said request, wherein the logic element is arranged to process said extracted data to generate response data and to pass said response data to the logic engine.

Such a module does not require the re-coding of an engine in order to effect a change in the apparent functionality of the engine to an end user. Thus, the present invention allows the effective incorporation of bespoke functionality into a business engine between releases of the business engine resulting in quick, efficient and reliable provision of bespoke functionality.

As the change is effected at the remote server that hosts the application programme access of servers belonging to another party is not required. The present invention improves data security compared to arrangements involving third party supplier's databases.

Furthermore, because the module is remote from the business engine should there be an error in the coding of the module the business engine will continue to function. The present invention improves the robustness of a business system compared to the prior art arrangements.

Such a remote system requires only a small amount of data associated with a request to be transferred between the engine and the module in order to provide the bespoke service required by a client of the engine.

The customisation module may comprise an application programming interface (API). Typical APIs comprise web service and Tuxedo (from BAE). The API may be coded within coding for a website or an existing web service. The API may comprise a data structure comprising data entries corresponding to rules, which when executed result in the generation of said response data. The rules may govern the interrogation of the application and may also govern the calculation of the response data. The API may be described by means of procedure oriented description (POD) data. The POD data may comprise Extensible Mark Up Language (XML). The POD data may comprise Web Service Description Language (WSDL).

The module may comprise a plug arranged to plug into the website or the existing web service.

The logic engine may comprise a business logic engine. The business logic engine may comprise a booking engine. The booking engine may comprise a travel booking engine.

According to a second aspect of the present invention there is provided a business system comprising a logic engine, a client server, the logic engine and the client server being arranged to be in communication via a network, the logic engine comprising data structures corresponding to business logic, and the server hosting a remote customisation module according to the first aspect of the present invention, wherein the remote customisation module is arranged to provide response data derived from data stored on the client server to the logic engine in response to interrogation data received from a plug located at the logic engine.

The logic engine may define an error condition, for example a time out. The logic engine may be arranged to either return to a default mode should the error condition be met. If the error condition is a time out the logic engine may be arranged to return a time out response to a user, should the time out condition be met.

According to a third aspect of the present invention there is provided software which, when executed upon a processor causes the processor to act in as the remote customisation module of the first aspect of the present invention.

According to a fourth aspect of the present invention there is provided a method of increasing the functionality of a logic engine by providing a remote customisation engine according to the first aspect of the present invention wherein the remote customisation engine is arranged to return response data corresponding to a parameter required to fulfill a user request received at the logic engine where the logic engine is not programmed to provide data corresponding to the parameter data.

BRIEF DESCRIPTION OF THE DRAWINGS

Embodiments of the present invention will now be described, by way of example only, with reference to the accompanying drawings, in which.

DETAILED DESCRIPTION OF EMBODIMENTS OF THE INVENTION

Figure 2:
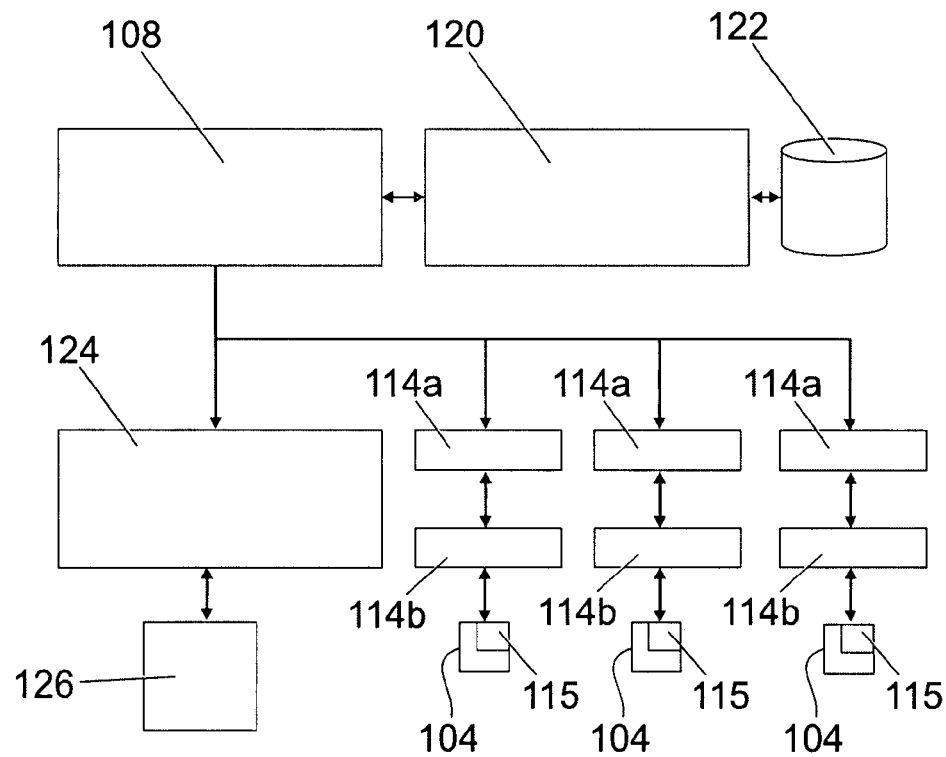
FIG. 2 is a schematic diagram of the layer structure of an embodiment of a business system comprising a remote customisation module according to an aspect of the present invention.
Figure 1:
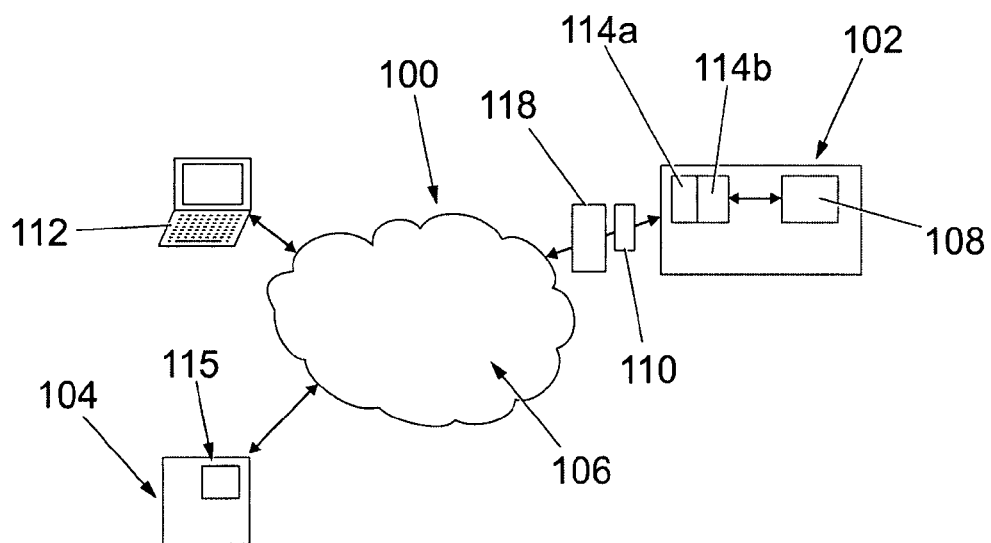
FIG. 1 is a schematic diagram of an embodiment of a booking system comprising a remote customisation module according to an aspect of the present invention.

Referring now to FIGS. 1 and 2, a booking system 100 comprises a booking engine 102 and a client server 104 linked via a network 106. Typically, the network 106 is the Internet or a private network. Usually, the client server 104 is a travel booking server, for example an airline booking server or a hotel booking server.

The booking engine 102 comprises a back end booking business logic module 108, a data adapter 114a and a plug 114b. The adapter 114a maps parameter data sent by the business logic module 108 into a bespoke form for each client server 104 in order that the server 104 can be successfully interrogated. The plug 114b interfaces with the client server 104 and executes the functions of interrogating the client server 104 and executing bespoke business logic associated with a customisation module 115.

Typically, the business logic module 108 comprises business logic software that controls the generation of a reply to a user generated query received from a remote terminal 112.

A communication module 110 provides connectivity between the booking engine 102, a remote terminal 112 and the client server 104 via the network 106.

The client server 104 comprises the remote customisation module 115. The remote customisation module 115 is defined in WSDL as an endpoint that operates on messages containing procedure-oriented information. The operations are described abstractly, and then bound to a network protocol and message format to define an endpoint. Related concrete endpoints are combined into abstract endpoints (services). WSDL is extensible to allow description of endpoints and their messages regardless of what message formats or network protocols are used to communicate. Typical protocols and message formats include SOAP 1.1, HTTP GET/POST, and MIME. The configuration to access the remote customisation module 115 is effected by a configuration module 120 and a central business database 122 within the business logic module 108.

In use, the communications module 110 receives data associated with a user query via a load balancing arrangement 118 in a manner that will be known to a person skilled in the art and the passes the query to the business logic module 108.

The business logic module 108 processes a user generated query to check the availability of, for example, a seat on a flight. However, a client associated with the client server 104 may require information beyond that governed by the business logic contained within the business logic module 108. This is flagged by the business logic module 108. The business logic module 108 then calls the data adapter 114a and the plug 114b to interrogate the client server 104. For example, in the case of an airline booking the calculation of a fuel surcharge may be required that is not provided for in the business logic module 108.

The business logic module 108 assigns elements of a user request to either a booking engine connector 124 or a remote customisation module 115 dependent upon whether the business logic module 108 can deal with them. If the element of the user query can be dealt with by the booking engine 102 it passes to a booking engine logic module 126 via the booking engine connector 124. Response data from the booking engine logic module 126 passes back to the business logic module 108 via the booking engine connector for inclusion in answer data to be output to a user in response to their user query.

As the booking engine 102 is in communication with a multiplicity of client servers 104 the configuration module 120 calls a site parameter from the data base 122 that corresponds to whichever server 104 is required to satisfy the request. Typically, the site parameter is in the form of a universal resource locator (URL) corresponding to a web service that can satisfy the request, this is usually a client's server.

For example, in the case of a fuel surcharge the data adapter 114a formats the data into the correct format for the appropriate client server 104. For example Lufthansa may require a different data format to Air France or Iberia. The plug 114b determines which sub set of data from an overall data structure are required to calculate the fuel surcharge. Such an overall data structure may take the form of a "Trip Plan" containing flight origins and termini, flight times and durations, hotel bookings and special requests. In the case of a fuel surcharge the plug 114b passes the flight origin and terminus of the flight to the remote customisation module 115 as interrogation data.

Typically, either the plug 114b or the booking engine connection 124 places a response time out parameter into the interrogation data at this point. The interrogation data passes from the business logic module 108 to the client server 104 via the communications module 110.

The interrogation data contains parametric values required to calculate the information that the business logic 108 cannot provide. These parametric values are retrieved from the business logic module 108 in response to calling of client server interrogation routine.

The remote customisation module 115 then applies bespoke business logic relevant to the client operating the client server 104 to the parameters forwarded by the plug 114b to return a value for the fuel surcharge.

The client server 104 returns response data to the business logic module 108 via the network 106 and the communications module 110. In the case of a fuel surcharge the response data will correspond to a monetary value. However, it will be appreciated that the response data may comprise any numerical value or character string corresponding to a field or information required to fulfill the user query. For example, the response data may include an indicator of whether a passenger requires a vegetarian meal option.

Should a response time out parameter have been defined by the business logic module 108 the request may be timed out if the response data is not received at the business logic module 108 before the expiry of the time out period. If this occurs the business logic module 108 can either return to a default mode in which processing of the user request continues in the absence of the additional information or a timeout message is routed by the communications module 110 to the user terminal 112 via the network 106.

The business logic module 108 incorporates the response data into reply data to be sent to the user. The user receives the reply data on a display at the terminal 112 via the network 106.

The passage of user requests and their response can be cached at the booking engine 100 and can, if desired, be reviewed or replayed in order to fault find. Additionally, the customisation module can be tested by executing dummy transactions without compromising the integrity of the core business logic.

The use of differing sub sets of an overall data set associated with a transaction, such as a "Trip Plan", allows the use of a single instance of a generic adapter-plug pairing 114a,b to access generate a number of response data from differing client servers or multiple instances of response data from a single client server.

It will be appreciated that although described with reference to a time out parameter the business logic module may return to a default mode should any one, or combination, of pre-defined error conditions occur.

It will be appreciated that the use of a plug-in web service module allows the re-use of a previously generated module at a further server in order to provide the same, or similar additional functionality. Such re-use may require limited recoding of the small web service plug-in and is therefore easier, quicker and less prone to the incorporation of programming errors than is a recoding the business logic of the business logic module.

It will be appreciated that although described with reference to travel data, including but not limited to flight bookings, hotel bookings and travel insurance, the present invention is suitable for use in any business system in which additional functionality is effectively added to a business engine by means of a plug at a remote web service.

While various embodiments of the invention have been described, it will be apparent to those skilled in the art once given this disclosure that various modifications, changes, improvements and variations may be made without departing from the scope of the invention.

The invention claimed is:

1. A computer system for receiving a request from a user and providing a response thereto; the system including:
a processor;
a logic engine adapted on the processor to communicate with a remote third party server, wherein the logic engine is arranged to be in communication with the remote server via a network and are is remote from the remote server the logic engine comprising a logic module, and an adapter and interface, and wherein the remote server is adapted to host one or more applications and an application programming interface (API) which is capable of accessing the one or more applications on the remote server in response to an interrogation from the logic module, wherein the logic module is adapted to receive and process the request from the user and determine whether the request requires third party data which is not available in the logic engine;
wherein the logic module is adapted to identify the third party to enable the adapter and interface to configure the request in a predetermined format to send to the API and to receive from the API messages in the predetermined format and convert back to the format supported by the logic module;
wherein the logic engine is adapted to call the adaptor and interface to interrogate the remote server by sending a message in the predetermined format to the API to ensure that the API will be able to act upon the message to thereby obtain and return the third party data from the remote server; and
wherein the logic module is adapted to receive the returned third party data from the remote server and generate a response to the request which response is determined by using the third party data;
wherein the API is described by procedure orientated description (POD) data and;
wherein the POD data comprises XML or WSDL.

2. The system of claim 1, wherein the logic engine can access many different remote servers to access third party data from different third parties.

3. The system of claim 2, wherein the message format depends on which remote server is being accessed.

4. The system of claim 1, wherein the message format is determined by a configuration module and communicated to the adapter and interface.

5. The system of claim 1, wherein the adapter and interface format the message to the correct format for the required remote server.

6. The system of claim 1, wherein the adapter and interface determine a subset of data from the remote server required by the logic module to complete the response.

7. The system of claim 1, wherein the third party data can include a value determined by the remote server in response to the interrogation.

8. The system of claim 1, wherein obtaining and using third party data avoids the need of reprogramming the logic engine to determine new responses to new requests.

9. The system of claim 1, wherein bespoke functionality can be incorporated into the logic engine by accessing a remote server.

10. The system of claim 1, wherein the logic engine is a booking engine for booking services, such as travel, from one or more third parties.

11. The system of claim 1, wherein the third party data includes numerical values, character strings and bespoke client functionality.

12. The system of claim 1, further comprising:
a logic engine for use in the system.

13. The system of claim 1, further comprising:
an adapter for formatting a message into a predetermined format for use in the system.

14. The system of claim 1, further comprising:
an interface for determining a subset of data from a remote server required by a logic module to complete a response, for use in the system.

* * * * *

UNITED STATES PATENT AND TRADEMARK OFFICE
CERTIFICATE OF CORRECTION

| | | |
|---|---|---|
| PATENT NO. | : 7,913,264 B2 | Page 1 of 1 |
| APPLICATION NO. | : 11/709521 | |
| DATED | : March 22, 2011 | |
| INVENTOR(S) | : David Noblet et al. | |

It is certified that error appears in the above-identified patent and that said Letters Patent is hereby corrected as shown below:

Column 2 line 14 - before "a plug" delete "the"

Column 5 line 56, Claim 1 - before "is remote" delete "are"

Signed and Sealed this
Twenty-eighth Day of June, 2011

David J. Kappos
*Director of the United States Patent and Trademark Office*